United States Patent [19]

Ewart et al.

[11] 4,185,513
[45] Jan. 29, 1980

[54] UNIVERSAL COUPLING

[75] Inventors: James M. Ewart, North Vancouver; Clay H. Anderson, West Vancouver; Gerard St. Jean, Vancouver, all of Canada

[73] Assignee: C. H. Anderson and Associates Ltd., North Vancouver, Canada

[21] Appl. No.: 784,681

[22] Filed: Apr. 5, 1977

Related U.S. Application Data

[62] Division of Ser. No. 625,460, Oct. 24, 1975, Pat. No. 4,022,430.

[51] Int. Cl.² ............................................. F16H 1/16
[52] U.S. Cl. .................................................. 74/425
[58] Field of Search ......................................... 74/425

[56] References Cited

U.S. PATENT DOCUMENTS

| | | | |
|---|---|---|---|
| 2,581,123 | 1/1952 | Merkle | 74/425 X |
| 2,730,908 | 1/1956 | Chillson | 74/425 |
| 2,732,726 | 1/1956 | Hakonson | 74/425 |
| 2,881,629 | 4/1959 | Homier | 74/425 |
| 3,316,034 | 4/1967 | Wanlass | 74/425 X |
| 4,026,163 | 5/1977 | Merkert | 74/425 |

Primary Examiner—Leonard H. Gerin
Attorney, Agent, or Firm—Stanley E. Johnson; Richard J. Hicks

[57] ABSTRACT

A mobile vehicle is disclosed having a boom pivotally mounted thereon for slewing about a vertical axis and a work head attached to the free end of the boom by a universal mounting. The universal mounting consists of a first housing having a base attached to the boom and a power driven worm in drive relation with a worm gear in the housing. The worm gear has a central hub to which is connected a second housing and which in turn has a driven worm in drive relation with a worm gear mounted therein. The worm gear in the second housing has a central hub and to which is attached a support carrying the work head.

8 Claims, 12 Drawing Figures

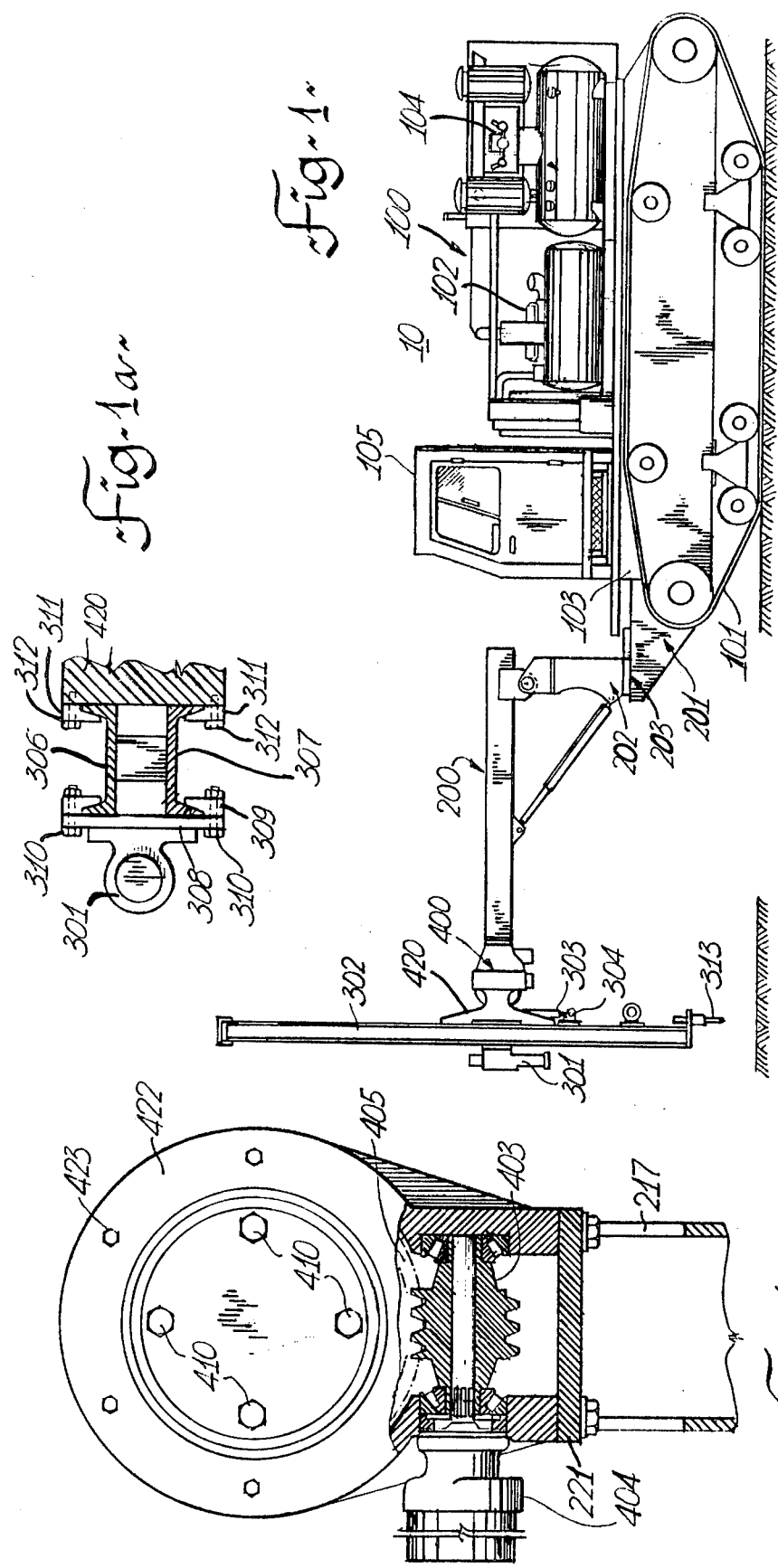

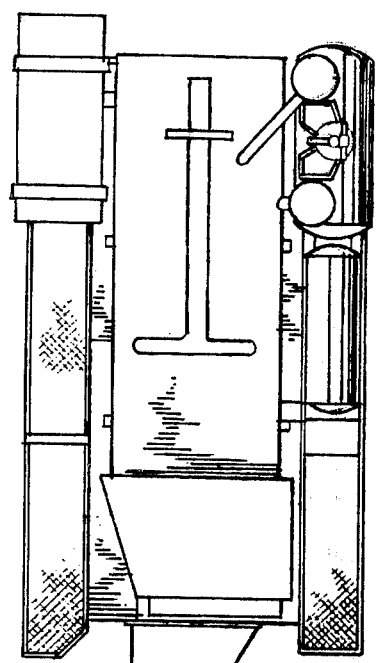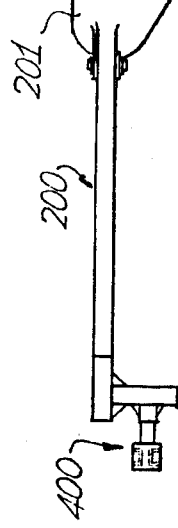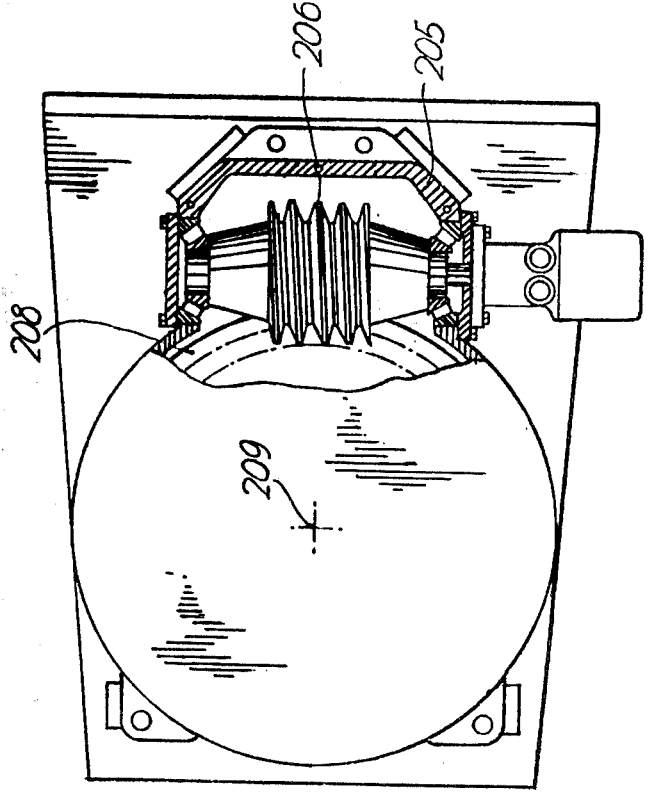

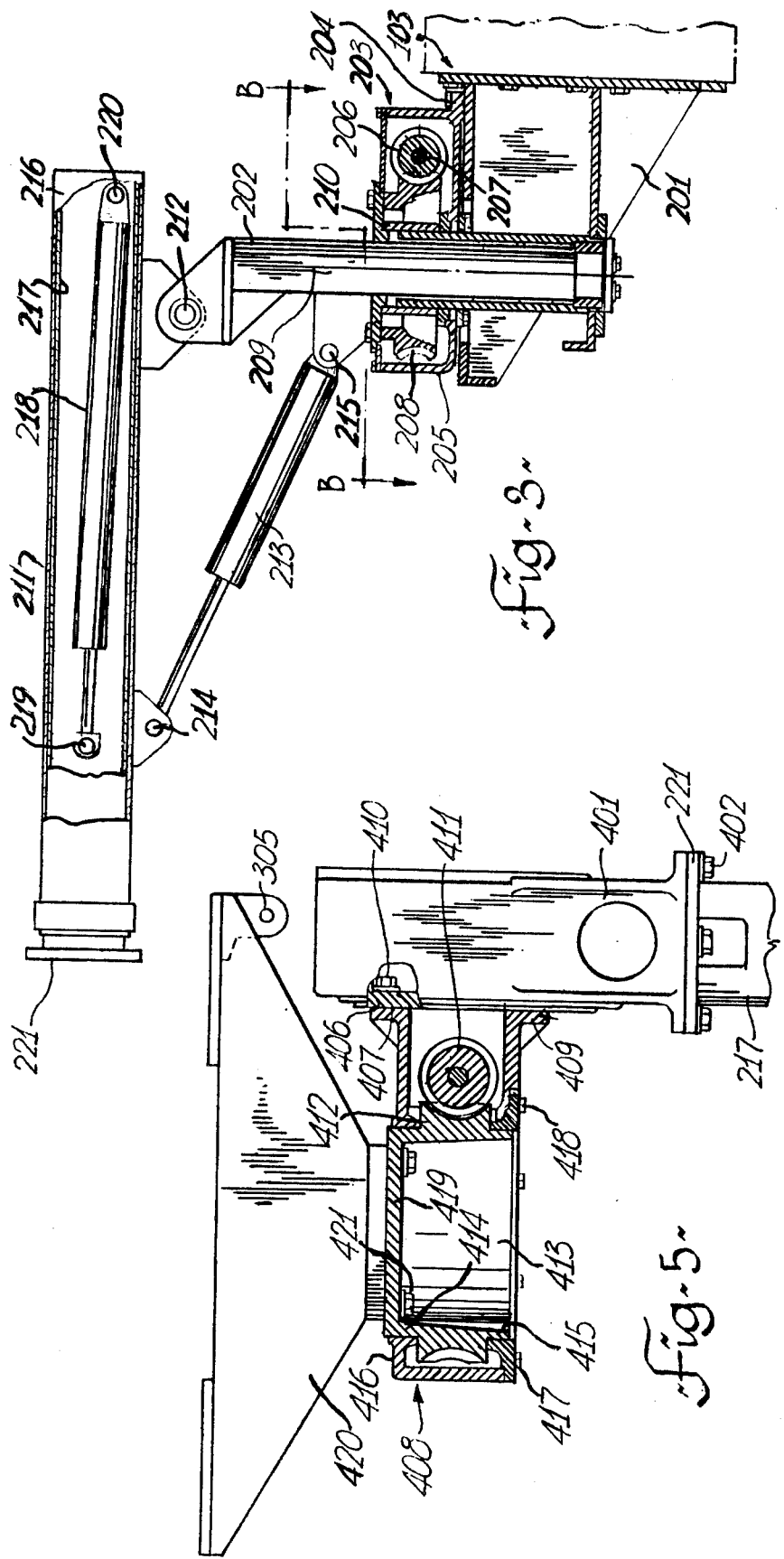

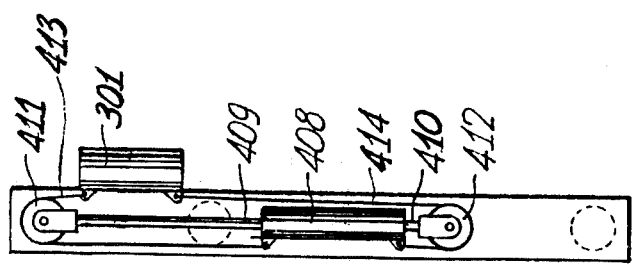
Fig-8
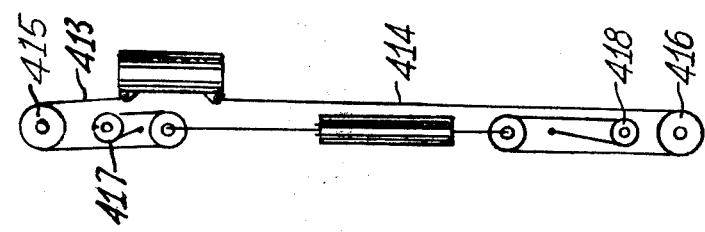
Fig-10
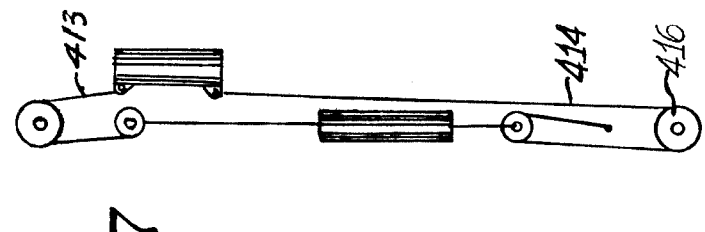
Fig-9
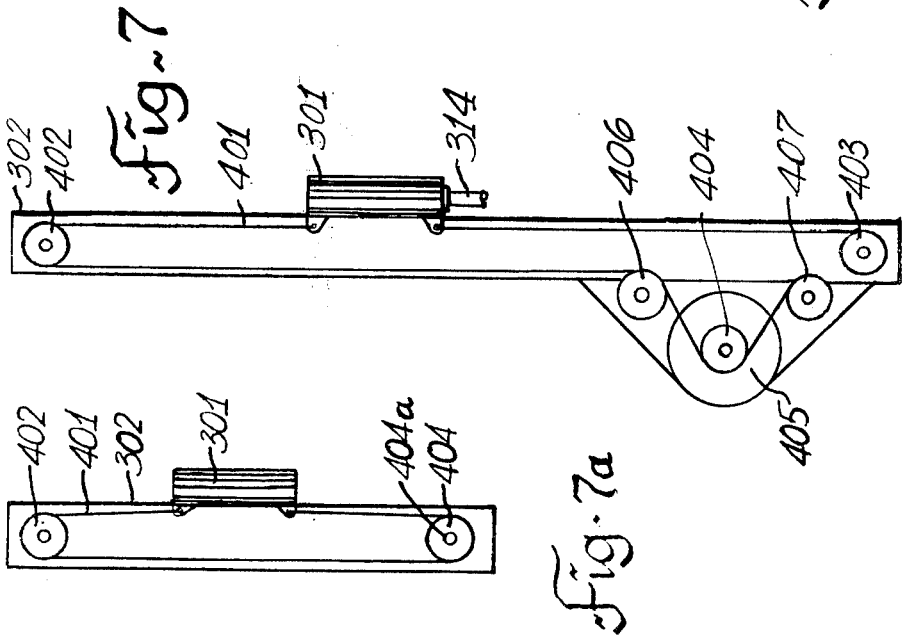
Fig-7
Fig-7a

UNIVERSAL COUPLING

This is a division of application Ser. No. 625,460 filed Oct. 24, 1975, now U.S. Pat. No. 4,022,430.

This invention relates generally to a machine having a work head mounted on the free end of a boom. The invention particularly relates to a universal coupling for mounting the work head on the boom and to a machine having the work head mounted on the boom thereof by said universal coupling.

A machine having the work head mounted thereon by the universal coupling of the present invention is intended for drilling holes in rock. However the universal coupling has application in other areas, for example, mounting a work head, i.e. felling head on the free end of an extendible and retractable boom of a tree felling machine wherein it is desirable to position the work head by pivotal movement about two mutually perpendicular pivot axes.

Machines for drilling holes in rock are extensively used in road building, mining and other applications where rock removal by blasting is required. Many machines are known for this as exemplified by Canadian Pat. Nos. 371,307, 552,447, 642,362 and 644,375.

Many machines are also known for felling trees wherein a felling head is mounted on the free end of an extendible and retractable boom and after the tree is severed from its stump, the boom and felling head are manipulated to controllably fell a tree to a horizontal position. Tree harvesters are also known wherein, after the tree has been felled, it is fed to processing assemblies on the machine and in either tree felling or manipulation to position a tree in the processing assemblies various mountings are used.

It is an object of the present invention to provide a universal coupling for mounting a work head on a boom permitting controllably variously positioning the work head on the machine.

It is a further principal object of the present invention to provide a simplified and compact universal coupling.

It is a further principal object of the present invention to provide a machine incorporating such universal coupling mounting a work head on the free end of a boom which preferably is of the extendible and retractable type.

A further object of the present invention is to provide an improved apparatus for effecting movement of the work head on the boom.

Accordingly, in accordance with one aspect of the present invention there is provided a universal coupling for mounting a work head or support therefor on a boom to controllably position the work head by pivotal movement about two mutually perpendicular axes comprising:
  (a) a first housing having a base adapted for mounting on a member such as a boom,
  (b) a power driven worm mounted on said first housing in drive relation with a worm gear, said worm gear being mounted for rotation on said first housing,
  (c) a second housing having a base secured to the worm gear of said first housing for rotation therewith, and
  (d) a power driven worm mounted on said second housing in drive relation with a second worm gear, said second worm gear being mounted for rotation on said second housing and adapted to be secured to a mounting of a work head.

In accordance with a further aspect of the present invention there is provided a machine having a boom mounted thereon and a work head mounted on the free end of the boom by the foregoing universal coupling.

In accordance with a further aspect of the present invention there is provided a machine of the foregoing type wherein the work head is longitudinally slidably mounted on a beam secured to the second worm gear on said second housing for rotation therewith.

The invention is illustrated by way of example in the accompanying drawings wherein:

FIG. 1 is a side elevational view of a rock drilling machine in accordance with the present invention;

FIG. 1A is a partial top plan view of a portion of the machine illustrated in FIG. 1;

FIG. 2 is a top plan view of the machine shown in FIG. 1;

FIG. 3 is a partial sectional side elevational view of the boom portion of the machine illustrated in FIGS. 1 and 2;

FIG. 4 is a partial sectional view along section B—B of FIG. 3 showing drive means for slewing the boom about a vertical axis;

FIG. 5 is a partial sectional view of a universal coupling in accordance with the present invention for mounting the work head on the free end of a boom;

FIG. 6 is a right-hand side elevational view of the universal mounting shown in FIG. 5;

FIG. 7 is a diagrammatic illustration of a drive arrangement for moving the work head longitudinally along a beam secured to the universal mounting;

FIG. 7A illustrates a modification of the drive arrangement illustrated in FIG. 7; and FIGS. 8, 9 and 10 are diagrammatic illustrations of alternative drive arrangements for moving the work head along the beam.

Referring now in detail to the drawings, shown in FIG. 1 is a rock drilling machine 10 consisting of a track type vehicle 100 having a boom 200 pivotally mounted thereon and a work head 300 attached to the free end of the boom by a universal coupling 400.

The vehicle 100 is a crawler type track vehicle having tracks 101 driven by a diesel engine 102 mounted on a vehicle frame 103. The engine 102 drives an air compressor or hydraulic system designated generally 104 to power the boom and work head carried on the free end of the boom. The power train from the engine 102 to the tracks 101 and air or hydraulic system 104 is preferably two separate clutches permitting independent control for the respective functions and by an operator in a cab 105 mounted on the vehicle frame.

The boom 200 has a base 201 detachably secured as by bolts or the like to the vehicle frame 103. A boom mounting post 202 is journalled in the base 201 for rotation about a vertical axis and is rotated by a worm gear drive unit 203 detachably secured to the base 201 by bolts or the like 204. The drive unit 203 consists of a housing 205 having a power driven worm 206 mounted therein and journalled for rotation about an axis 207. The worm is driven by an hydraulic or electric motor mounted on the housing 205. The worm 206 meshes with a worm gear 208 journalled for rotation in the housing 205 about an axis 209 perpendicular to the axis 207. The worm gear 208 has a hub 210 drivingly connected to the post 202 for rotating the same about the axis 209. An extendible and retractable boom 211 is pivotally mounted on the upper end of post 202 by a pivot pin 212 and pivotal movement of the boom about the pin 212 is effected by an hydraulic piston cylinder assembly 213 connected respectively at opposite ends by pins 214 and 215 to the boom 211 and post 202. The boom 211 is a telescopic type having an outer element 216 mounted by the pin 212 on post 202 and an inner element 217 movable reciprocally in element 216 by an hydraulic piston cylinder assembly 218 connected at opposite ends by pins 219 and 220 respectively to boom elements 217 and 216. The boom element 217 has a mounting plate 221 on the outer free end thereof and to which the universal coupling 400 is connected.

The universal coupling 400 is illustrated in detail in FIGS. 5 and 6 and consists of a first housing 401 secured to the boom end plate 221 by threaded studs 402. A worm 403 is journalled in the housing 401 and driven by an hydraulic or electric motor 404. The worm 403 drivingly meshes with a worm gear 405 journalled for rotation in the housing and has a hub 406 with an outer face 407 substantially flush or projecting slightly beyond the adjacent face of housing 401. A second housing 408, which is identical to the housing 401, has a base portion 409 secured to the hub 406 by studs 410. The base 409 has a flat face in abutting relation with the face 407 of the hub. A worm gear 411 is journalled for rotation in the housing 408 in the same manner as illustrated in section in FIG. 6 and is similarly driven by an hydraulic or electric motor. The worm meshes with a worm gear 412 having a central hub 413. The central hub 413 has respective portions 414 and 415 journalled in spaced-apart walls 416 and 417 of the housing 408. The wall 417 consists of an annular plate detachably secured to the housing 408 by studs 418 thereby permitting assembly and disassembly of the unit. The hub 413 has an outer face plate 419 to which a bracket 420 is secured by a plurality of studs 421. The housings 401 and 408 are identical and the worm gear 405 is mounted in housing 401 in the same manner as worm gear 412 is mounted in housing 408 and which is illustrated in detail in FIG. 5. Similarly the worm 411 is identical to the worm 403 and is mounted in housing 408 in the same manner as illustrated in detail in FIG. 6. The worm gear 405 is retained in housing 401 by an annular bearing plate 422 secured to the housing 401 by studs 423.

The bracket 420 provides means for mounting a work head and, according to FIGS. 1 and 2, consists of a pneumatically operated rock drill 301 and reciprocally mounted in a manner to be described hereinafter on a beam 302. The work head 301 may be any conventional unit known in the art for rock drilling by striking and rotary motion and accordingly details of the same are not included herein. The beam 302, having the head 301 slidably mounted thereon for reciprocal movement is in turn reciprocally mounted on the mounting bracket 420 and controllably moved by a hydraulic piston cylinder assembly 303 secured respectively at opposite ends by pins 304 and 305 to the beam 302 and mounting bracket 420. The beam 302 is a rigid member which may be constructed in any convenient manner and preferably consists of two channels 306 and 307 rigidly interconnected and oriented as shown in FIG. 1A. The work head 301 is bolted to the base plate 308 which in turn is slidably connected to beam 302 by one or more pairs of hook plates 309 which are secured to the base plate 308 by a series of bolts 310. Similarly beam 302 is slidably connected to the mounting bracket 420 by one or more pairs of hook plates 311 which are secured to the mounting bracket 420 by a series of bolts 312. The beam 302 has a chisel point pin 313 secured to the lower end thereof and projecting downwardly therefrom.

In FIGS. 7 to 10 inclusive are illustrated various means for effecting reciprocal movement of the drill head 301 on the beam 302. Referring to FIG. 7 chain 401 is secured respectively at opposite ends to the drill head 301 and which has a drill rod 314 projecting downwardly therefrom. The chain passes over rollers or sprockets 402 and 403 located within the beam 302 respectively adjacent the upper and lower ends thereof. The chain further passes around the sprocket 404 driven by a hydraulic, pneumatic or electric motor 405. A pair of rollers or sprockets 406 and 407 journalled on the beam 302 rollingly engage the chain respectively on opposite sides of the sprocket 404 directing the chain appropriately along internally of the track adjacent the drive unit.

An alternate arrangement is shown in FIG. 7A where the driving sprocket 404 is located adjacent one end of beam 302 and driven by a shaft 404a connected to an electric, hydraulic or pneumatic motor mounted on the beam. This arrangement reduces the number of sprockets and rollers required.

FIGS. 8, 9 and 10 illustrate an alternative drive utilizing an extendible and retractable hydraulic cylinder unit 408. The cylinder portion of the assembly 408 is securely mounted internally of the beam 302 and has piston rods 409 and 410 projecting respectively from opposite ends thereof. Sprockets 411 and 412 are journalled on the free outer end of respective rods 409 and 410, a chain 413 is secured respectively at opposite ends to the work tool 301 and the cylinder of the assembly 408 and passes over the sprocket 411. Similarly a chain 414 is secured at opposite ends to the tool head 301 and the cylinder casing of assembly 408 and passes over the sprocket 412. Reciprocal movement of the rods 409 and 410 by a common piston in the cylinder moves the rods in unison reciprocally within the beam and simultaneously therewith reciprocally moves the tool head 301 along the beam. In FIGS. 9 and 10 the chains 413 and 414 pass over additional sprockets journalled on the beam thereby varying the ratio between the tool head and cylinder travel. Referring to FIG. 9, chains 413 and 414 pass over respective sprockets 415 and 416 journalled respectively adjacent opposite ends of the beam 302. In FIG. 10 the respective chains 413 and 414 pass over additional sprockets 417 and 418 respectively journalled on the beam adjacent sprockets 415 and 416.

In the foregoing there is provided a self-contained mobile rock drill which under its own power may be controllably moved by the operator from one location to another and on the free end of the boom is a rock drill head selectively variously positionable by the operator for drilling holes in rock. The boom can be slewed about a vertical axis on post 202 and is self-locking in any position by virtue of the worm and worm gear drive. The boom is controllably raised and lowered through actuation of the hydraulic cylinder 213 and the boom may be selectively extended and retracted by the hydraulic cylinder 218. The coupling 400 mounted on the free end of the boom is controllably movable about two pivot axes, mutually perpendicular to one another and is driven by worm and worm gear thereby self-locking in any pivoted position. The beam 302 shown in a vertical position in FIG. 1 may be pivoted by the universal coupling 400 about a horizontal axis longitudinally of the machine to tilt the beam and about a horizontal axis perpendicular thereto. When the beam 302 has been suitably oriented by the operator, the beam 302 is slid downwardly on mounting brackets 420 by actuation of the hydraulic piston cylinder assembly 303, driving pin 306 into the surface and stabilizing the beam 302 during drilling operations. The tool head 301 thereafter is controllably moved downwardly by one of the drive mechanisms illustrated in FIGS. 7 to 10 inclusive, forcing the tool into the ground during a drilling operation.

As mentioned previously, the universal mounting 400 provided in accordance with the present invention may be utilized in other applications as, for example, to mount a tree felling head on the free end of an extendible and retractable boom carried by the vehicle. In the case of a tree harvester where tree processing units are mounted on the machine, the drives for the universal coupling are self-locking and thereby may be readily manoeuvred into an appropriate position, locating the tree relative to an intake feed mechanism for the processing units.

I claim:

1. A worm and gear drive unit comprising:
    (a) a rigid housing having first and second spaced apart side walls;
    (b) a unitary hub and gear unit journalled in said housing, said hub having a pair of spaced apart circular, relatively large bearing lands on the outer surface thereof journalled for rotation respectively on said first and second side walls;
    (c) said gear comprising teeth projecting outwardly from said hub at a position between said bearing lands and being of a diameter only slightly larger than the latter;
    (d) a worm journalled for rotation on said housing and meshing with said gear in drive relation;
    (e) bearing faces extending outwardly from said hub respectively on opposite sides of the gear and engageable with respective ones of said walls of the housing limiting axial displacement of the hub relative thereto;
    (f) an opening in one of said side walls exposing said hub therethrough; and
    (g) a central web on said hub, said web extending across said hub and being exposed through said opening in the side wall for rigidly connecting a working member directly thereto.

2. A worm and gear drive unit as defined in claim 1 wherein said bearing lands are disposed closely adjacent opposite side faces of said gear and wherein said side faces of the gear provide the bearing faces extending outwardly from the hub.

3. A worm and gear drive unit as defined in claim 1 wherein said web and one of the bearing lands are substantially in alignment on the longitudinal axis of the hub.

4. A worm and gear drive unit as defined in claim 1 wherein said web has an outer face projecting beyond one of the walls of the housing.

5. A worm and gear drive unit as defined in claim 1 wherein one of said walls includes a plate detachably secured thereto providing a portion of such wall and wherein one of the lands on said hub is journalled for rotation in said plate.

6. A worm and gear drive unit as defined in claim 5 wherein said plate and the other wall of the housing have annular flanges directed inwardly toward one another providing bearing surfaces engageable with respective ones of the outwardly directed bearing faces on the hub.

7. A worm and gear drive unit as defined in claim 5 wherein said plate is an annular member.

8. A worm and gear drive unit as defined in claim 1 including a motor mounted on the housing and drivingly connected to said worm.

* * * * *